March 8, 1938.  S. S. GREEN  2,110,418
ELECTRIC METER
Filed March 26, 1936  3 Sheets-Sheet 1

Inventor:
Stanley S. Green,
By Louis Robertson
Atty.

March 8, 1938.  S. S. GREEN  2,110,418
ELECTRIC METER
Filed March 26, 1936  3 Sheets-Sheet 2

Inventor:
Stanley S. Green,
By Louis Robertson
atty.

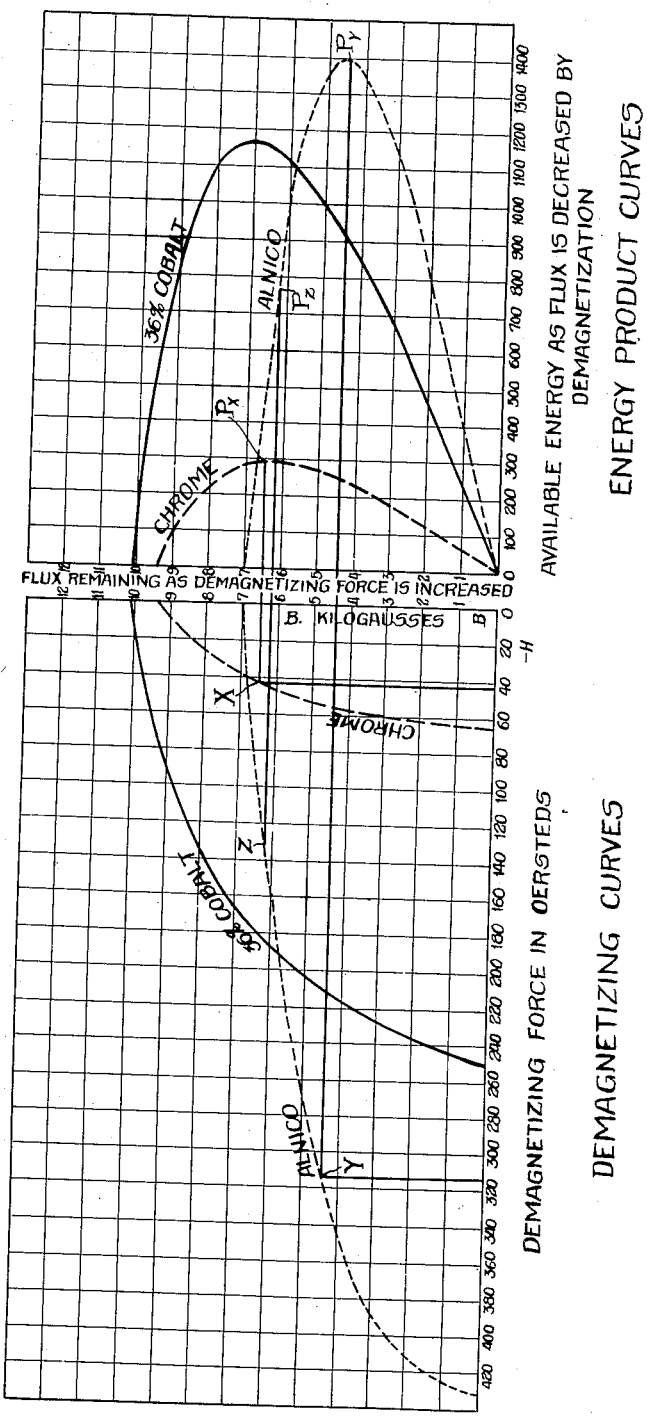

UNITED STATES PATENT OFFICE 2,110,418

ELECTRIC METER

Stanley S. Green, La Fayette, Ind., assignor to Duncan Electric Manufacturing Company, La Fayette, Ind., a corporation of Illinois Application March 26, 1936, Serial No. 70,951

17 Claims. (Cl. 171—264)

This invention relates to electric watthour meters and has been illustrated as being embodied in a two-element meter. In most of its aspects it is equally suitable for single element meters, and in fact one of the important advantages of the illustrated form is the readiness with which it may be converted to a single element meter.

For many years efforts have been made to produce meters so that they would be not only more satisfactory in operation but also more economical in manufacture and more economical in use from the standpoint of taking up the minimum amount of wall space. In my copending application Serial No. 33,116, I disclosed a polyphase meter which takes up only the wall space heretofore required by a single phase meter, while at the same time conforming to present high standards in electrical performance. That application covers the interference-proof disc for polyphase meters, and a novel arrangement of the major parts which is more efficient and satisfactory, especially from the manufacturing standpoint and in requiring the minimum of wall space. The present application is intended to cover various improvements, most of which are made possible by using this latter feature, and involve the use of very high coercive permanent magnet steels. Although the metals themselves are not new, their use in kilowatt-hour meters is new and has various advantages which are peculiar to electric meters.

The type and arrangement of damping magnets is an important feature of this invention, but to make its significance clear, it is necessary to briefly explain the action of damping magnets in an electric meter. A damping magnet sets up a magnetic field for opposing the rotation of the disc to make its speed proportional to the power consumption measured by the meter. The disc does not touch the magnets, and in fact rotates with as little friction as possible. It is common practice in damping magnet arrangements to provide two adjacent fields of opposite polarity through which the meter disc rotates. The damping effect depends upon the speed of change of flux in a given portion of the disc as it passes through these fields. This speed of change depends, in turn, not only on the total magnetic flux in these fields, but also on their concentration and proximity. The most important parts of the two fields are those parts which are adjacent to one another, since the stronger these two parts are, the more rapid will be the change of flux through a given portion of the disc as it passes from one to the other.

In the past, one common way of producing adjacent fields of opposed polarity and adequate strength was to provide a large magnet having both of its poles above the disc, with an armature below the disc opposite said poles, the flux passing downwardly from one pole into the armature and upwardly from the armature to the other pole. This was a fairly economical manner of attaining this result, but it had several drawbacks which caused it to be discontinued commercially.

Due to the fact that the magnets, in order to be large enough to have adequate strength, extended close to the sides of the meter case, it was impossible to mount several meters side by side in closely spaced relationship without introducing what was called an "adjacency error", because large portions of the damping magnet of one meter were so close to those of another meter that there would be appreciable flux leakage between the two magnets. According to the present invention this is overcome by using a small and properly positioned magnet made of a high-coercive magnetic material instead of a large magnet of a metal conventionally used in watthour meters, such conventional metals having relatively low coercive characteristics. This small but high-coercive magnet is placed at a position sufficiently removed from the periphery of the meter case, as shown at 32 in Fig. 1, so that there is no appreciable meter adjacency error. At the same time the efficiency obtained by having two opposed fields from one magnet is retained by having both poles on one side of the disc, as seen in Fig. 6. This is in contrast to another prior practice in which the adjacency error due to the use of one large magnet was avoided by using two smaller magnets, one for each of the two opposed fields, each magnet straddling the disc, having one pole above the disc and the other below, and the two magnets being alined and positioned almost end to end. This construction, however, was more expensive, partly because of the difficulty of accurately mounting the two magnets as well as the extra cost of fabricating two magnets instead of one. Such a construction is also especially unsatisfactory when economy of space about the disc is necessary. Nevertheless this is the practice which has been universally followed in recent years in all meters of the highest quality.

The large single magnet of the discontinued prior art also failed to make the best use of the available magnetic flux, since it failed to concentrate the flux from the two poles in the zones adjacent one another as thoroughly as this should be done. According to the present invention the fluxes are very concentrated in these most effective zones, as seen in Fig. 6. One method of accomplishing this is shaping the magnet so that only the faces of the poles are adjacent to the disc, the magnet extending upwardly from these poles instead of substantially parallel to the disc as did the large single magnets of the prior art mentioned. Another feature which contributes toward the same end of concentration of flux is shaping the magnet so that its cross section adjacent its poles is less than its cross section elsewhere, especially at its central portion (the upper half of the magnet). It is obvious that except for leakage, the flux of the entire magnet is thus concentrated in the relatively small pole pieces.

With the large prior art magnet mentioned, one factor which detracted from concentration of flux in the most effective zones was the use of a round armature, this armature being round so that it could be turned on a screw to be screwed toward or away from the meter disc and the magnet beyond the disc for the purpose of adjustment. According to the present invention the armature is made generally rectangular corresponding in shape to the desired zone of concentration, so that it need not have any parts drawing the magnetism away from the zone of concentration. For the purpose of adjustment, the armature may be divided, and one part of it moved parallel to the disc relative to the other part. The two parts of the armature are thus partially separated to impede the flow of flux through the armature.

Another drawback to the magnets heretofore used in meters is their requirement for a substantial amount of temperature compensation, which compensation takes the form of diverting part of the flux of the magnet from its useful channels. According to the present invention the magnets are made of a type of metal which requires relatively little temperature compensation and therefore can use a relatively greater amount of their flux for the damping effect.

An additional objection to the magnets of the prior art is that to prevent their being permanently weakened by stray fields, as a field from the current magnet if there should be a short circuit, it was necessary to protect the permanent magnet from said field either by considerable distance or by a suitable shield. Either form of protection involved expense and inconvenience. According to the present invention the magnets are of such nature that this protection is not necessary, a high-coercive material being used.

The objects of the invention are not only to overcome the difficulties previously mentioned, but also to provide a more economical and satisfactory meter construction aside from these particular considerations. One specific object, for example, is to provide an improved form of meter adjustment which, though very economical, is exceedingly delicate and accurate and capable of utilizing substantially all of the available flux.

Other objects and advantages of my invention will be apparent from the following description, taken with the drawings, in which:

Fig. 7 is a chart showing magnetic characteristics of metals.

Figure 1:
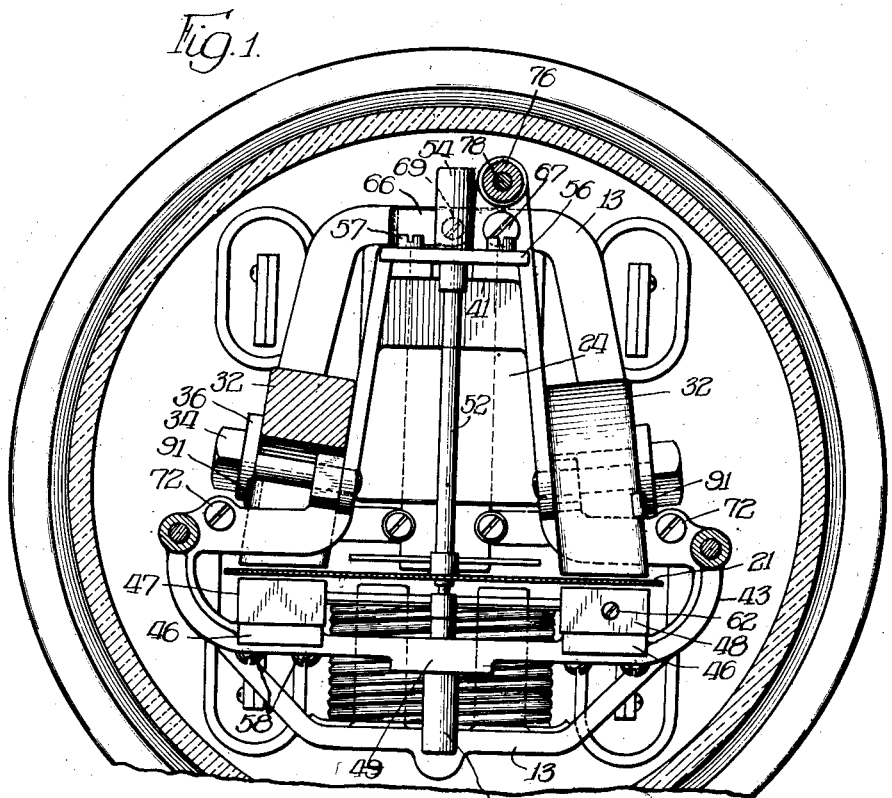
Fig. 1 is a front sectional view of the form of meter chosen for illustration, taken approximately through the line 1—1 of Fig. 3, with a portion of the case broken away.

Although this invention may take numerous forms, only one has been chosen for illustration. In this form the meter includes any suitable meter base 11 and cover 12 as well as the meter mechanism mounted on said base and enclosed by said cover. The meter mechanism includes an inner driving unit having a laminated core 13 which is mounted on the base in any suitable manner, a frame 14 mounted on the core 13 of the inner driving unit, an outer driving unit having a laminated core 16 mounted on said frame 14, a meter disc 21 rotatably carried by the frame, the damping magnets 32 and their armatures 47 and 48 forming an important part of this invention, and a register indicated diagrammatically at 23. The driving units may be identical with those shown in my copending application Serial No. 48,713, although the laminated cores 13 are preferably made up of a thinner stack of laminations than was illustrated in that application. Each driving unit includes a voltage coil 24 and a current coil 26. In the preferred form the laminations are secured together partly by spacer rivets 68 which also secure attachment lugs 78 and 79 to the cores.

*Arrangement of parts*

An important feature of the preferred form of this invention is the arrangement of the driving units and permanent magnets 32 as shown, with the driving units at opposite sides of the disc and the magnets 32 between the driving units and at opposite sides of the disc axis from one another, with these damping magnets having both poles adjacent one face of the disc (by which is meant that both poles are above or both poles are below the disc) and their armatures on the opposite face of the disc and alined with their poles. This arrangement of parts permits securing adequate damping torque for a two-element meter in a minimum of space, without any material adjacency error, and at exceptionally low cost. This feature of arrangement is covered in applicant's copending application previously mentioned, and it should be borne in mind that many of the remaining features may be used without this feature.

*Meter frame*

Figure 2:
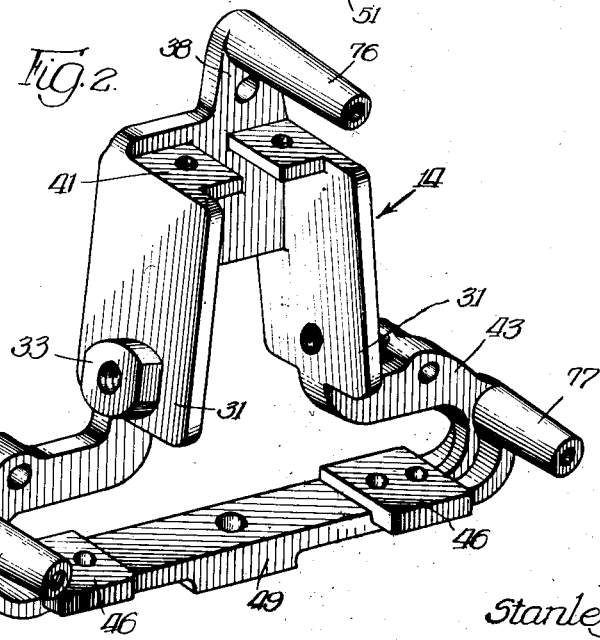
Fig. 2 is a perspective view of the meter frame shown in Fig. 1.

The desirable arrangement with damping magnets between driving magnets is attained largely through the use of the frame 14 which is secured to the spacer rivets 68 and 74 of core 13 in any suitable manner. The frame 14 is constructed as shown clearly in Fig. 2 and is cast of a nonmagnetic material such as aluminum. It includes a pair of inclined seats 31 against which the magnets 32 are secured. There may desirably be a raised boss 33 on each of these seats 31, through which is drilled a hole suitably threaded for a screw which holds the magnet in place.

A washer 36 of non-magnetic material may desirably be provided between the head of the screw and the magnet. The seats 31 are extended upwardly and integrally connected to mounting lug 38 and to brackets 41. The brackets 41 support the upper disc bearing as is described below.

Extending downwardly from the seat 31 is an integral extension in the form of a loop 43, which loop extends around and under the meter disc 44 and includes at its bottom portion seats 46 on which are mounted the armatures 47 and 48 as explained below. The central portion of the loop 43 forms a support for the lower bearing holder 51. This bearing holder is not new with the present invention and therefore need not be described in detail. It passes through the bearing support portion 49 and screws into the same, having an annular shoulder which seats against the bottom of the support portion 49. The bearing holder 51 preferably has a jewel bearing on which the meter disc 44 rotates. The upper end of the shaft 52 of the meter disc is kept in the vertical position in a substantially frictionless manner by an upper bearing pin which is held in a bearing holder 54. The preferred construction of this bearing holder is adequately illustrated in my said copending application Serial No. 48,713. This bearing support 54 screws into a plate 56 which is shown as secured to the brackets 41 as by suitable screws 57, though the plate may be an integral part of the frame 14.

Damping magnet armatures

The armature 47 is preferably a rectangular block of metal of high magnetic permeability such as commercially pure iron. Its upper face is preferably directly opposite the faces of the poles of the adjacent permanent magnet 32 and coextensive with the outer edges of the poles. The armature 47 is secured in place in any desirable manner as by screws 58 extending through the seat 46 and screwing into the armature 47. It is evident that the disc 44 rotates between the magnet 32 and the armature 47.

Figures 3, 4, 5, 6, 8:
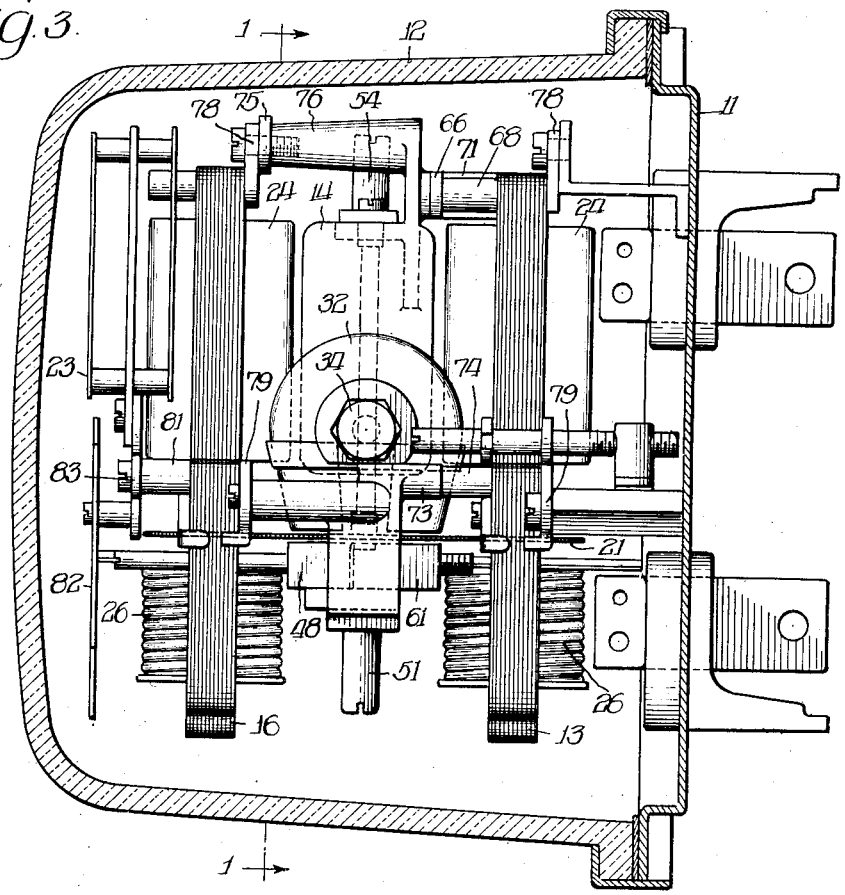
Fig. 3 is a vertical sectional view through the meter case, showing the meter element in side elevation.
Fig. 4 is a vertical sectional view through the meter adjusting armature.
Fig. 5 is a horizontal sectional view through the same.
Fig. 6 is a side view of a magnet comprising one feature of this invention, with an armature and a fragment of a disc adjacent thereto, and the direction of flux indicated.
Fig. 8 is a fragmentary plan view of a preferred form of meter disc.

The armature 48 may be the same as the armature 47 but it is preferred that it be in two relatively movable parts to provide for adjustment of the meter, unless other adjustment of this type is provided. It should be understood that it is common practice to adjust meters by varying the amount of damping flux which passes through the meter disc. In the present instance this is accomplished by shifting that part of the armature to which the numeral 48 is applied toward or away from the other part which is designated by the number 61. The portion 61 may be secured to its seat 46 in the same manner as the armature 47 is secured to the other seat 46. The portion 48 may slide on the seat 46 and is adjustable towards and away from the armature portion 61 by means of a screw 62 engaging both portions of the armature. Various screw arrangements may be used such as having the screw threaded in one member and simply pivoted in the other member without being longitudinally movable therein. To permit more delicate adjustment, however, the arrangement shown in Figs. 4 and 5 is preferred.

According to this construction the screw 62 has two differential or independent threads 63 and 64 formed thereon, both of which are right hand threads, though both may be left hand threads. The thread 64 has slightly greater pitch than the thread 63. It follows that when the screw is turned clockwise, it screws to the right in the segment 61 and also in the segment 48 but, due to the differential pitch, it screws to the right in the segment 61 faster than in the segment 48, and thus draws the segment 48 towards the segment 61.

Likewise when the screw 62 is turned in the opposite direction, it screws to the left in segment 61 faster than in segment 48 and hence it separates the segment 48 from the segment 61. This movement is limited, however, by engagement of threads 64 with the segment 48 since the threads 64 will not fit the threads in the segment 48 which engage the threads 63. It is thus seen that the length of the unthreaded or reduced portion 65 between the threads 63 and 64 may be utilized together with the difference in pitch to determine the maximum amount of separation of the two armature portions 48 and 61.

It should be observed that the differential thread arangement may be designed to give any desired degree of delicacy of adjustment, even though both of the threads may be fairly large and strong. If the pitch of one thread differs from that of the other by only a hundredth or a thousandth of an inch per revolution, the armatures will be separated by only the corresponding amounts. Expressing this differently and giving a typical preferred example, if the thread 64 has a pitch of twenty-four turns to an inch, and the thread 63 has a pitch of thirty-two turns to an inch, then in one revolution of the screw it will move one twenty-fourth of an inch in the block 61, but it will move one thirty-second of an inch in the other block 48. The net movement of the block 48 will therefore be one twenty-fourth of an inch minus one thirty-second of an inch, or, in other words, one ninety-sixth of an inch.

Operation of adjustable armature

The operation and effect of the adjustable armature are quite simple. As the two portions are separated, the reluctance of the armature flux path is increased and therefore less flux passes from the magnet through the disc to the armature and back through the disc to the magnet than with the armature portions closer together. It follows that the damping effect is reduced. It is possible that part of the reduction in damping effect is due to shifting the position of the flux as well as to decreasing the amount of the flux, inasmuch as when the portion 48 is moved away from the portion 61 it is no longer directly opposite the face of the pole of the magnet 32 and therefore the flux may no longer be concentrated at its most effective position.

Mounting of frame

The frame 14 is secured at its top to the core 13 of one driving unit by means of a bracket 66 which may be secured to the lug 38 by a screw 67 and to spacer rivet 68 by a screw 69. The bracket 66 may desirably have a leg 71 extending beyond the spacer rivet 68 and against the core 13 for further rigidity. The frame 14 is further secured to the core 13 by screws 72 which may desirably pass through bosses 73 formed on the frame, and screw into spacer rivets 74 on the laminated core structure 13.

Mounting of front driving unit

The front driving unit is secured to the frame in a manner similar to the mounting of the inner unit, or rather it is secured to a link 75 secured to post 76 which is formed on the lug 38 of frame 14, and to the posts 77 formed on the looped portion of the frame 14. The driving unit 16 is provided with an attachment lug 78 through which a screw is passed and screwed into the bracket 76. It is likewise provided with outstanding attachment lugs 79 through which screws may be passed and screwed into posts 77. It will be observed that the two core structures 13 and 16 are identical, even as to the lugs provided for mounting. As a matter of fact, spacer rivets 81 on the front core 16, similar to the spacer rivets 74, may be used for mounting the register 23 and name plate 82, both of which are secured to mounting plate 83 which is secured directly to said spacer rivets.

Damping magnets

For many years a chrome steel of relatively low coercive force has been used in meter magnets because the meter designs were not such as to take advantage of the high-coercive steels which have been available in the last few years. One typical such steel contains 3.50 percent chromium, .90 carbon, .33 manganese, .101 phosphorus, .015 sulphur, .29 silicon, .20 nickel, and the rest iron.

Some of the permanent magnet steels which have become available commercially having much higher coercive force values, are the high cobalt steels and the nickel aluminum steels. One form of the latter group which has become available commercially is known by the trade designation of "Alnico" because in addition to about 20% nickel and about 12% aluminum it also contains about 5% cobalt, the rest being iron. A good survey of the field of such available materials together with a bibliography is contained in an article by C. S. Williams in the January, 1936, issue of Electrical Engineering and need not be further discussed here. There are numerous patents purporting to relate to high-coercive steels, including Patents Nos. 1,633,805, 1,947,274, 1,989,551, 1,968,569, 2,027,994, 2,027,995, 2,027,996, 2,027,997, 2,027,998, 2,027,999, and 2,028,000.

For reference, the following table of typical coercive values of different common materials is included:

| | Coercive force in oersteds | Approximate maximum residual flux in kilogauss |
|---|---|---|
| Low-coercive steel: | | |
| Old or usual form of chrome steel | 60 to 64 | 9.4 |
| High-coercive steels: | | |
| 36% cobalt steel | 240 to 260 | 10.2 |
| Alnico | 420 to 440 | 7.0 |

It will be observed that the chrome steel cannot be considered as in a class with the latter two materials, since these are characterized by having a coercive force value of at least three times that of the chrome variety that of Alnico being over six times. There are, of course, steels between those mentioned above, such as 17% cobalt steel, but this table shows the difference between low and high coercive steels.

It will be noted from the second column that the residual flux values of the Alnico are somewhat lower than for the other materials but this is more than made up for by the high coercive value of the material when used in accordance with this invention because the structure, gap and shaping of the magnet in this case is such as to capitalize on or take advantage of this factor rather than to throw it away. The last two metals are able to force much more flux through the meter disc than chrome steel or others of its class, if each were made up in a magnet of a given size.

Although various general characteristics of these metals have been known almost as long as the metals themselves, the metals have certain advantages peculiar to kilowatt-hour meters not known before the present invention. This is partly because all the higher coercive materials are much greater in cost on a weight basis than the commonly used chrome variety. Radical changes in mode of application to the watthour meter mechanism have been necessary to make their use commercially possible, since high-coercive steel used along the lines of recent meter designs would have had much more total coercive force than could be used effectively, and hence much higher cost than would have been justified.

The primary change has been the use of a new magnet of short total length compared with the gap length. With the chrome steel the ratio of useful magnet length to gap length has usually exceeded 50 to 1. In the present preferred form of the invention I have found a ratio of even as low as ten to one to be sufficient. This has been the basis for the selection of a small length magnet of general horse-shoe shape but of heavy cross-section in which the flux is forced through the disc gap twice, thus, in reality, doubling the actual length of gap as far as the flux path is concerned. Such extra gap length is the means by which the high coercive force of the steel is utilized. It may be noted at this point that if the armature is fixed with respect to the magnet, as is armature 47, the available coercive force in a magnet may be more fully used, since it is not necessary to provide an excess to take care of adjustment. For this reason other means of adjustment than varying the armature may be preferred. The departures in fundamental gap relations and shaping have resulted in a damping magnet so radically different from former watthour meter practice as to introduce entirely new space and arrangement problems in its application to the meter disc. The solution of these has resulted in a meter of great flexibility, light weight, low cost, and simplicity of assembly, together with the other advantages mentioned elsewhere.

The use of a smaller magnet permits the most advantageous positioning of these magnets, especially in that it permits their being included within the space above the disc rather than projecting outwardly beyond the disc, and thus it overcomes the tendency to adjacency errors when two meters are located closely together.

To get the best use of a given weight of metal, the magnets are preferably shaped substantially as shown in Fig. 6, in which it is seen that the magnet, though of general horseshoe shape, is thicker at its center top portion than at its poles. The larger cross section of the magnet near the midpoint must carry not only the useful damping flux which crosses the gaps, but also the leakage flux between the poles. Thus the cross section near the poles need not be as great to secure operation of the magnet at the most efficient point of substantially uniform flux density throughout its length. Moreover, this tapering of the poles has the additional advantage of causing the flux density at the poles to be as great as further back in the magnet and, as has been pointed out, this concentration of flux density at the gap greatly increases the damping effectiveness of a given amount of flux, especially when the concentrated flux zones of opposite direction are closely adjacent to one another. The shape of the magnet shown would give approximately uniform flux density throughout the magnet.

Referring to Fig. 6, it is seen that to the left of the line A—A the flux is all downward, and to the right of the line A—A the flux is all upward. Thus as a given portion of the disc 21 lies under the pole S, the flux will be passing downwardly through it, but when said portion moves to lie under the pole N, the flux will be passing upwardly through it. It is this change in the direction of flux passing through a given portion of the meter disc which produces the damping effect, and the more rapid the change is, the greater is the damping effect. In other words, it is the intensity of flux just to the left of the line A—A and just to the right of the line A—A which is most important in the damping effect. Due to leakage between the poles S and N, it is not possible to get high concentration of flux exactly adjacent to the line A—A, but it is possible to concentrate the flux approximately under the faces of the poles by means of the use of the armature 47. Since greater concentration of the flux close to the line A—A produces greater damping effect, it follows that by tapering the poles, the flux is less spread out and is therefore concentrated under the poles, and hence closer to the line A—A than if the poles, not being tapered, extended further away from the line A—A. In order to obtain a magnet having this tapered shape economically, it is preferred to use a magnetic metal which may be cast or molded to this shape. It should be noted that the proportions shown in Fig. 6 are approximately those of an alnico magnet which has been found to be satisfactory. The outer face is shown, and is slightly longer than the inner face on account of the slant of the magnet. If the magnet is tapered too much, its efficiency might be impaired on account of increased flux leakage.

The use, in accordance with this invention, of the rectangular armatures 47 and 48 substantially no larger than the spread of the poles, also contributes to the concentration of flux, since if the armature extended beyond the area of desired concentration it would draw some of the flux away from this area. As a matter of fact, it may be desirable to have the armature slightly smaller in the direction concentric with the disc than the dimension across the pole faces of the magnet in this direction. It might also be better to have the outer opposite sides of the poles and of the armatures radial rather than parallel.

From Fig. 1 it will be observed that the magnets 32 are slightly inclined. The chief advantage of this is that the average spacing between adjacent magnets of adjacent meters is greater, although the faces of the magnets are kept at the most effective position close to the edges of the meter discs. As a matter of fact, it is preferred that the corners of the poles of the magnets extend approximately to the edge of the disc so as to obtain the greatest damping torque.

As previously stated, magnets made with the preferred metal have very little temperature error, since they have a relatively low temperature coefficient with respect to the magnetic flux which they produce. They do have a slight temperature error, however, and the remaining parts of the meter such as the cores 13 and 16 also have very slight temperature errors. To compensate for these errors and overcome them, a temperature compensating clip 91 may be provided. These clips may be secured underneath the washers 36, one under each washer, and may be somewhat U-shaped if desired so as to extend closer to the faces of the poles of the magnet, thus straddling the horizontal portion of the frame 14 as do the magnets themselves. The washers 36 may be specially shaped, being flattened along their lower side so as to fit above the horizontal portion of the frame 14 and, if desired, being recessed on their inner faces to receive the clips 91. As is well known, these temperature compensating clips may be made of any magnetic metal having a negative temperature coefficient such as nickel steel. One well known steel widely used for this purpose contains 29.5% nickel and approximately 69.5% iron.

Certain important advantages of mounting the damping magnets above the disc and with armatures below, have already been discussed: it permits avoiding adjacency error, makes a compact arrangement of parts possible, and provides adjacent opposed fields from a single magnet. There are, however, at least two other important advantages as compared to using two adjacent magnets each having one pole above and one below the disc. One is obtaining the desired width of gap and the other is in the adaptability of a two-element meter to a single-element meter.

*Resistance of damping magnets to magnetic disturbances*

When meters are installed under practical conditions on the utilities' supply lines to service customers, they are likely to be subjected to two classes of magnetic disturbance. In the first of these, a short circuit occurs on the load side of the meter (that is on the consumer's side) which may cause a transient current of from one hundred to even one thousand or more times the rated current of the meter to flow through the current coils, (depending upon the short-circuit capacity of the supply system and the severity of the short-circuit). In the second of these classes of magnetic disturbances, the potential circuit of the meter is subjected to a transient over-voltage of very short duration, usually because of a surge caused by lightning. These lightning surges may be of all magnitudes up to a value sufficient to burn up the meter, but the great majority of surges are insufficient to do this, and dissipate themselves by causing abnormally large transitory currents in the potential windings. When either one or a combination of the above two classes of abnormal surges occur, strong magnetic fields are set up around the meter coils and their core structures may become completely saturated, causing strong leakage fields. These transient fields may be of the order of hundreds or even thousands of times the normal value of the leakage fields to which the damping magnets are subjected in usual operation. These transient fields are usually produced by alternating current and in consequence are demagnetizing.

In prior art meters, designers have always guarded against such fields by keeping the damping magnets as far away as possible from the electromagnet coils (usually on the diametrically opposite side of the meter disc). Even further than this, they have (in the best quality of meters) always provided some form of shield of magnetic material (usually cast iron) between the electromagnet and the permanent magnet. Thus, prior art meters have often or usually had the frame of the meter of cast iron. The shielding effect has only guarded against magnetic surge effects partially as it is practically impossible to completely guard against a magneto-motive-force by magnetic shield means. Distance between the electromagnet coils (where the disturbance originates) and the permanent magnets has been an even more important factor than the shielding of the prior art.

In the present invention the damping magnets are placed in close proximity to the electromagnet coils. Moreover, the frame of the meter is preferably of cast aluminum, and there is no room for the addition of magnetic shields (and without greater space as well, the shield could not function effectively). It is therefore evident that the two most important safeguards of the prior art are completely absent, and a commercially acceptable job in the reduced space would be impossible except for the greatly augmented use of a third safeguard.

This third safeguard may be more easily understood by reference to Fig. 7, and especially the left hand portion thereof. Chrome steel has usually been magnetically "aged" before its application to a meter. This "ageing" has consisted in the application of a demagnetizing force (usually in the form of a magnetic field produced by an alternating current). This force has usually been one sufficient to bring the residual flux down to approximately the point X on the curve. It will be seen that this point is at the value of B and —H where the maximum energy product $P_x$ is produced for the chrome steel. The maximum energy product of a magnet is the highest product obtained by multiplying the coercive force at any point on its hysteresis curve (Fig. 7) by the flux intensity at that point. At the top of the curve the product is 0 because the coercive force is 0. At the bottom of the curve the product is 0 because the flux is 0. Somewhere between there is a maximum energy product. Of course X could be brought down still further on the curve but not much further without considerable sacrifice in energy product and hence in damping effectiveness. With the chrome steel this demagnetizing force applied is about forty-five oersteds (gilberts per centimeter). Against demagnetizing forces up to but not exceeding this, the magnet would be immune.

With Alnico, the demagnetization can be continued without great sacrifice of damping efficiency to the point Y where a value of about 320 oersteds is obtained (or over seven times the value with chrome steel), with approximately the maximum energy product $P_y$.

Of course it may not always be necessary to go to the extreme of descending on the Alnico curve to the point Y but if necessary it can be done. The result would be a magnet immune to demagnetizing forces up to approximately 320 oersteds. In this connection it should be noted that some of the available coercive force of the magnet is consumed in driving the useful or damping flux across the gap, but in general much of it remains to be fully available as a safeguard against demagnetizing stray fields.

Some examples may make this matter of ageing more clear. A chrome steel magnet in wide use (by the applicant's company) has a developed length of six inches, a single gap of .100", and withstands from 200 to 250 ampere turns of alternating current demagnetization (or knockdown, as it is commonly called).

An Alnico magnet, preferred in the present invention, has the same damping power, has a developed length of three inches, with two gaps of .125" each and withstands 250 to 300 ampere turns of alternating current knockdown. The knockdown ampere turn values per inch of developed length for the two are:

Chrome _____ 33–42
Alnico _____ 83–100

In this example the Alnico had not been knocked down nearly to the point Y but instead was being operated at a point at about Z. Obviously if it is not necessary to go to Y, there is some economy by operating at a point such as Z.

It can be shown by expert and detailed analysis that the knockdown ampere turns per unit of length are a close measure of the degree of immunity of a given magnet to demagnetizing influences such as the aforementioned surges. Therefore it can be seen that the Alnico magnet,—depending upon what A. C. knockdown is deliberately given to it,—can be made at least two times as resistant as magnets of the prior art while producing almost as much flux, even in a closed circuit, or three or more times as resistant while having much greater energy value.

Actual tests have shown that the utilization of this third and last factor, to the necessary degree, is the most reliable way of guarding against surges. The inventor has constructed and tested a meter with spacings and arrangement according to this invention which was actually more resistant to surges than any prior art meter, notwithstanding the close spacing.

The present invention marks the first time that damping units and driving units have ever been successfully used in close proximity and without shields between them of magnetic material.

*Material used in meter frame*

It has previously been mentioned that the meter frame is made of aluminum. Of course many other non-corrosive non-magnetic metals of adequate strength which can be cast to shape may be used as well. As has just been discussed, the use of a high coercive material in the damping magnets makes possible this use of a frame which does not act as a shield for the magnets, although the arrangement of parts is so compact that shielding would be necessary otherwise.

There are numerous advantages in the use of this type of frame which greatly enhance the value of the use of the high coercive metal which permits the use of the frame. For the first time it has been possible to get along without added clamp members or the equivalent. Now it is possible to secure the permanent magnets directly to the frame without increasing the flux leakage. The manner of obtaining gap accuracy is explained under the next heading.

Another advantage is the elimination of troublesome magnetic particles which always are likely to get into the meter with any machined parts made of a magnetic metal such as the old cast iron frames. These particles could not be removed reliably in any commercially practical way, and in a meter they were especially likely to accumulate on the poles of the magnet, thus affecting the speed of the disc.

Another advantage is that the frame does not need to be painted, since it is inherently non-corrosive. There has always been trouble in the past with paint chipping off and getting in the bearings or gap as well as leaving the frame exposed to corrosion. In this connection it may be mentioned that the Alnico magnets are also rust proof, so that paint may be omitted from them also.

The advantage in reduction of weight in the use of an aluminum frame (and in the use of any frame of its skeleton nature) is obvious.

*Obtaining desired gap width*

With the magnet arrangement shown, it is not necessary to grind the gap between the poles to the desired size as when the disc must rotate through this gap. With the present construction, the desired gap width can be obtained with adequate accuracy simply by applying the armatures 47 and 48 and magnets before the disc is in place. A spacer gauge is placed on each armature and the corresponding magnet 32 is slid along its seat 31 until its rests on the spacer gauge and then the screw 34 is tightened to maintain this spacing. The gauge is then removed and the assembly of the meter is completed.

*Conversion to single-element meter*

Another advantage of the type of magnets here used, and one which is newly attained by the present invention is that a two-element meter mechanism such as the polyphase meter illustrated, may be converted to a single element meter simply by removing the front driving unit 16 and the left hand one of the damping magnets 32. Perhaps more important than this from the standpoint of the user of meters, a single phase type can be changed into a polyphase meter by adding the front electromagnet element and one damping magnet, and of course changing the connections for the outside circuit accordingly. Also, a manufacturer can make either single phase or polyphase meters from the same stock of parts. As a matter of practice, the disc will usually be changed, since for the polyphase meter it is preferred to use an interference proof disc such as that shown in Fig. 8 having five insulated laminations, each having five radial slots extending from the outer edge nearly to the center of the discs. Such discs are expensive and are not necessary in single phase meters. The advantage of having the other parts standard for both single phase and polyphase meters is very important nevertheless.

*Torque-balanced disc*

Another novel result of the illustrated arrangement of parts is that the forces around the disc are balanced in such a way that there is no radial pull on the disc shaft when the two driving elements are measuring equal power consumptions, no matter how great the torque may be. The two driving elements act on the disc as a whole in exactly opposite directions (one to the right and one to the left), and the two damping magnets also act in exactly opposite directions, so that each set of forces is balanced except as to torque. With suitable bearing design, this saves wear on the bearings of the disc, as compared to a construction in which both the damping magnet and the driving element being on opposite sides of the disc, tend to shift the disc bodily in one direction so that the bearing has to counteract this force.

Although but one embodiment of my invention has been herein shown and described, it is to be understood that the invention is not limited thereby, but is to be limited only by the prior art. The following claims are intended to point out some of the features now recognized as new, rather than to limit the invention to these features, except as the prior art may require.

I claim:

1. An electric watthour meter including a continuously rotatable disc, a plurality of driving units acting on said disc and having approximately parallel core structures adjacent diametrically opposed peripheral portions of the disc, and an upwardly extending damping magnet located between the cores with its pole pieces adjacent one face of the disc, and an armature adjacent the other face of the disc and alined with said pole pieces, said magnet slanting from the disc inwardly, and said magnet being formed of a metal having a coercive strength higher than one hundred eighty oersteds.

2. An electric watthour meter mechanism including a disc mounted for continuous rotation about a given axis, a plurality of driving units acting on said disc and having approximately parallel core structures adjacent diametrically opposed sides of the disc, a damping magnet substantially within a cylindrical space subtended by the disc extending steeply away from the disc, and having its poles close together and both adjacent the same face of the disc and spaced substantially equally from said axis, and an armature opposite said poles and adjacent the opposite face of said disc and constituting a low reluctance path for causing the flux to pass through the disc in opposite directions in passing from one pole of the magnet to the other, said damping magnet being made of a magnetic material having a coercive strength of at least 180 oersteds and being in a magnetic state corresponding to its having been previously magnetized and then subjected to a knockdown force equivalent to at least 120 oersteds.

3. A watthour meter including a driving unit for rotating a disc, a suitably supported frame of non-magnetic metal, a disc mounted on said frame for continuous rotation, a damping magnet secured directly to said frame and having both poles adjacent one face of the disc for retarding the rotation of the disc, said frame extending around to the opposite face of the disc from said magnet, and an armature secured to said frame opposite said magnet but adjacent said opposite face of the disc.

4. A watthour meter comprising a torque producing electromagnet, a disc driven by the electromagnet and capable of continuous rotation, and a damping magnet for said disc, said magnet being of general horseshoe shape with its end faces comprising pole faces both of which are adjacent one face of the disc and having an armature cooperating with said pole faces adjacent the opposite face of the disc, said magnet being made of a material having a coercive force of at least 180 oersteds and being of such size and so positioned with respect to the armature that the ratio of the length of the flux path in the coercive portion of the magnetic circuit to the combined length of the air gaps in the path through the air to the armature and return is less than 25 to 1.

5. A watthour meter comprising a torque producing electromagnet, a disc driven by the electromagnet and capable of continuous rotation, and a damping magnet for said disc, said magnet being of general horseshoe shape with its end faces comprising pole faces both of which are adjacent one face of the disc and having an armature cooperating with said pole faces adjacent the opposite face of the disc, said magnet being made of a material having a coercive force of at least 180 oersteds, and being of such size and so positioned with respect to the armature that the ratio of the length of the flux path in the coercive portion of the magnetic circuit to the combined length of the air gaps in the path through the air to the armature and return is less than 15 to 1.

6. A watthour meter comprising a torque producing electromagnet, a disc driven by the electromagnet and capable of continuous rotation, and a damping magnet for said disc, said magnet being of general horseshoe shape with its end faces comprising pole faces both of which are adjacent one face of the disc and having an armature approximately coinciding in shape with the outer edges of the pole faces cooperating with said pole faces adjacent the opposite face of the disc, said magnet being made of a material having a coercive force of at least 180 oersteds and being of such size and so positioned with respect to the armature that the ratio of the length of the flux path in the coercive portion of the magnetic circuit to the combined length of the air gaps in the path through the air to the armature and return is less than 25 to 1.

7. A watthour meter comprising a torque producing electromagnet, a disc driven by the electromagnet and capable of continuous rotation, a damping magnet for said disc, said magnet being made in general horseshoe shape with its legs tapering toward their ends over a substantial portion of their length and with its end faces comprising pole faces both of which are adjacent one face of the disc and having an armature cooperating with said pole faces adjacent the opposite face of the disc, said magnet being made of a material having a coercive force of at least 180 oersteds, and being of such size and so positioned with respect to the armature that the ratio of the length of the flux path in the coercive portion of the magnetic circuit to the combined length of the air gaps in the path through the air to the armature and return is less than 25 to 1.

8. A watthour meter comprising a torque producing electromagnet, a disc driven by the electromagnet and capable of continuous rotation, and a damping magnet for said disc, said magnet being of general horseshoe shape with its end faces comprising pole faces both of which are adjacent one face of the disc and having an armature cooperating with said pole faces adjacent the opposite face of the disc, said magnet being made of a material having a coercive force of at least 180 oersteds, and being of such size and so positioned with respect to the armature that the ratio of the length of the flux path in the coercive portion of the magnetic circuit to the combined length of the air gaps in the path through the air to the armature and return is less than 25 to 1, and the entire magnet being located a substantial distance from the peripheral boundary of the meter case whereby adjacency error is substantially eliminated.

9. A watthour meter for polyphase measurements comprising a plurality of independent torque producing electromagnets, a disc driven by the electromagnets, capable of continuous rotation, and including a plurality of overlapping sections substantially electrically isolated from one another and each acted upon by only one of the driving magnets at a time, damping magnet means forming two adjacent opposed fields passing through said disc, and including at least one magnet having both poles adjacent the same face of the disc, said magnet being formed of a magnetic material of coercive strength higher than 180 oersteds and capable of operating above the point of its maximum energy product after being knocked down with a force corresponding to at least 120 oersteds.

10. A watthour meter including a base and a meter mechanism mounted on said base, said mechanism including a driving unit, a unitary frame formed of a non-magnetic material removably secured to said driving unit, a pair of spaced bearings carried by said frame, a disc rotatable in said bearings and positioned by said frame to be inductively acted upon by said driving unit, and a damping magnet carried by the frame with closely spaced poles adjacent one face of said disc, said frame extending around the edge of said disc adjacent the pole portions of said magnet, and an armature carried by said frame opposite said magnet but adjacent the opposite face of the disc.

11. A watthour meter including a base and a meter mechanism mounted on said base, said mechanism including a driving unit, a frame formed of a non-magnetic material removably secured to said driving unit, a pair of spaced bearings carried by said frame, a disc rotatable in said bearings and positioned by said frame to be inductively acted upon by said driving unit, and damping magnet means carried by said frame on the outside thereof and including closely spaced opposed pole portions adjacent the same face of said disc; said frame extending from the inside of said damping magnet means between said opposed pole portions and around the edge of said disc.

12. A watthour meter having a continuously rotatable disc, an electromagnet driving unit having current and voltage windings subject to abnormal surges, a damping magnet in close proximity to such windings and in substantially unshielded relation with respect thereto, said damping magnet being in a magnetic state corresponding to its having been previously subjected to knockdown force of at least 70 ampere turns per inch of developed length of the magnet and sufficient in magnitude for the magnet to withstand, with immunity from permanent weakening, the magnetic surges to which it is likely to be subjected in service in its environment in the meter, the magnetization of said magnet being still above a value at which it has approximately its maximum energy product.

13. A watthour meter having a continuously rotatable disc, an electromagnet driving unit having current and voltage windings subject to abnormal surges, a damping magnet in close proximity to such windings and in substantially unshielded relation with respect thereto, said damping magnet being made of a material having a coercive strength of at least 180 oersteds and being in a magnetic state corresponding to its having been previously subjected to a knockdown force of at least 70 ampere turns per inch of developed length of the magnet and sufficient in magnitude for the magnet to withstand, with immunity from permanent weakening, the magnetic surges to which it is likely to be subjected in service in its environment in the meter.

14. A watthour meter having a continuously rotatable disc, and an electromagnet driving unit having current and voltage windings subject to abnormal surges, a damping magnet system in close proximity to such windings having a magnetic circuit forming an air gap through which the disc rotates and including a magnet made of a material having a coercive strength of at least 180 oersteds and being in a magnetic state corresponding to its having been previously magnetized and then subjected to a knockdown force of at least 70 ampere turns per inch of developed length of the magnet; the remainder of the magnet system having substantially no coercive strength, and the ratio of the length of the coercive portion of the magnetic circuit to the total air gap length in the magnetic circuit being less than 25 to 1.

15. A watthour meter including a continuously rotatable disc, a driving unit for rotating said disc, and a damping magnet system including a damping magnet for producing opposed and adjacent concentrated fields cutting the disc, said damping magnet being made from a magnetic material of coercive strength higher than one hundred eighty oersteds, and said damping magnet system being positioned between vertical planes on each side of the meter passing through the periphery of the disc.

16. A watthour meter including a continuously rotatable disc, a driving unit for rotating said disc, and a U-shaped damping magnet for retarding the rotation of said disc, said damping magnet being made from a magnetic material of coercive strength higher than one hundred eighty oersteds, having closely spaced poles adjacent one face of the disc and being positioned substantially between vertical planes on each side of the meter passing through the periphery of the disc, and an armature opposite said magnet, adjacent the other face of the disc and directly bridging the poles.

17. A watthour meter including a continuously rotatable disc, a driving unit for rotating said disc, and a U-shaped damping magnet for retarding the rotation of said disc, said damping magnet being made from a magnetic material of coercive strength higher than one hundred eighty oersteds, having closely spaced poles adjacent one face of the disc and being positioned substantially between vertical planes on each side of the meter passing through the periphery of the disc, and an armature opposite said magnet, adjacent the other face of the disc and approximately coinciding in shape with the outer edges of the pole faces of the magnet.

STANLEY S. GREEN.